United States Patent [19]
Graus

[11] Patent Number: 6,143,174
[45] Date of Patent: Nov. 7, 2000

[54] FILTRATION UNIT WITH PLEATED FILTERING ELEMENTS

[75] Inventor: Andreas Graus, Nörten-Hardenberg, Germany

[73] Assignee: Sartorius AG, Göttingen, Germany

[21] Appl. No.: 09/246,631

[22] Filed: Feb. 8, 1999

[51] Int. Cl.[7] .................................................. B01D 63/14
[52] U.S. Cl. ................ 210/321.86; 55/521; 210/321.61; 210/446; 210/493.1; 210/493.5
[58] Field of Search ........................ 210/321.77, 321.86, 210/446, 493.1, 493.2, 493.5, 321.61, 493.3; 55/521; 96/4, 7

[56] References Cited

U.S. PATENT DOCUMENTS

| | | | |
|---|---|---|---|
| 3,765,536 | 10/1973 | Rosenberg | 210/446 |
| 3,765,537 | 10/1973 | Rosenberg | 210/446 |
| 4,113,627 | 9/1978 | Leason | 210/446 |
| 4,163,721 | 8/1979 | Lobden | 210/321.86 |
| 4,165,287 | 8/1979 | Goyne | 210/321.86 |
| 4,227,295 | 10/1980 | Bodnar et al. . | |
| 4,267,044 | 5/1981 | Kroplinski et al. | 210/321.77 |
| 4,414,172 | 11/1983 | Leason | 210/446 |
| 5,885,455 | 3/1999 | Grauss et al. | 55/521 |

*Primary Examiner*—Joseph W. Drodge
*Attorney, Agent, or Firm*—Chernoff, Vilhauer, McClung & Stenzel

[57] ABSTRACT

There is disclosed a filtration unit for separating a substance from a fluid, the unit made up of at least one pleated filter element in a cylindrical housing, the housing in turn made up of two mating housing components and at least two fluid connectors, the filter element separating the housing into inlet and outlet plenums with the periphery of the filter element adjoining the wall of the cylindrical housing; the periphery of the filter element and the periphery of the two mating components are all bonded to each other by a single integral sealant bond.

8 Claims, 4 Drawing Sheets

FILTRATION UNIT WITH PLEATED FILTERING ELEMENTS

BACKGROUND OF THE INVENTION

Compact filtration units with pleated filter elements are known, for example, from Swiss Patent No. 568,761 and from European Patent No. 0 154 845 A2. Swiss Patent No. 568,761 describes a compact filtration unit to be used as a blood filter which comprises a rectangular multi-component housing with coaxial fluid connectors that are separated from one another by a multi-layer pleated filter element. The pleated filter element is held at each of the two ends of its tapered pleats, between specially configured wall regions of the upper and lower housing halves and welded to them, and with two end faces is sealed by way of a sealant with a lateral closure in each case. Corresponding fluid-tight joints exist between the upper and lower halves and the two end plates of the housing. In all, a total of seven fluid-tight welds are present.

Commonly assigned European Patent No. 0 154 845 A2 discloses a round pleated filter element that has a specially designed seal flange adapted to be clamped in fluid-tight fashion between two housing halves by rivet-like fasteners, the housing halves being provided with annular channels on their periphery to accept sealant.

The principal drawbacks of both such prior art filtration units are their large number of components and large number of regions at which such components are joined in fluid-tight fashion to one another. In addition to being complex from the manufacturing standpoint, such devices often represent considerable sources of leaks which can result in premature failure of the filtration unit during use.

It is therefore an object of the invention to create, from a small number of components, a compact filtration unit with pleated filter elements which has a minimum of regions to be sealed.

BRIEF SUMMARY OF THE INVENTION

The object is achieved by providing a filtration unit for fluids comprising at least one pleated filtration element which is arranged in a cylindrical housing made up of at least two parts having fluid connectors, the filter element separating the housing into inlet side and outlet side plenums, with the open folds and ridges of a first side of the pleated filter element facing the inlet side plenum, and the open folds and ridges of a second side of the pleated filter element facing the outlet side plenum, and the peripheral edges of the pleated filter element being adjacent to the cylindrical housing wall and joined to it in fluid-tight fashion by a sealing compound. In an especially advantageous embodiment of the invention, all the components of the filtration unit are joined fluid-tight to one another by the sealing compound in a single integral bond.

Because of its rotational symmetry, the filtration unit of the invention exhibits uniform inflow even with extremely low-volume feed inlets. Dead spaces such as those encountered in angular filtration units and that can result in performance losses or contamination sources, are eliminated.

The filtration unit of the invention can be sterilized at temperatures up to at least 135° C. It can be backflushed, and can be operated from either side. The unit of is usable for filtration in the fields of biotechnology, genetic engineering, pharmaceuticals, chemistry, the food and beverage industry, and environmental protection. Because of its compactness, the favorable ratio between its filter surface and the housing volume, and its small dead volume, the unit is particularly suitable as a disposable unit for both laboratories and for scale-up work and, when fitted with membrane adsorbers, for recovering valuable materials.

The foregoing and other objectives, features and advantages of the invention will be more readily understood upon consideration of the following detailed description of the invention, taken in conjunction with the accompanying drawing.

BRIEF DESCRIPTION OF THE SEVERAL VIEWS OF THE INVENTION

DETAILED DESCRIPTION OF THE PREFERRED EMBODIMENT

Figure 1:
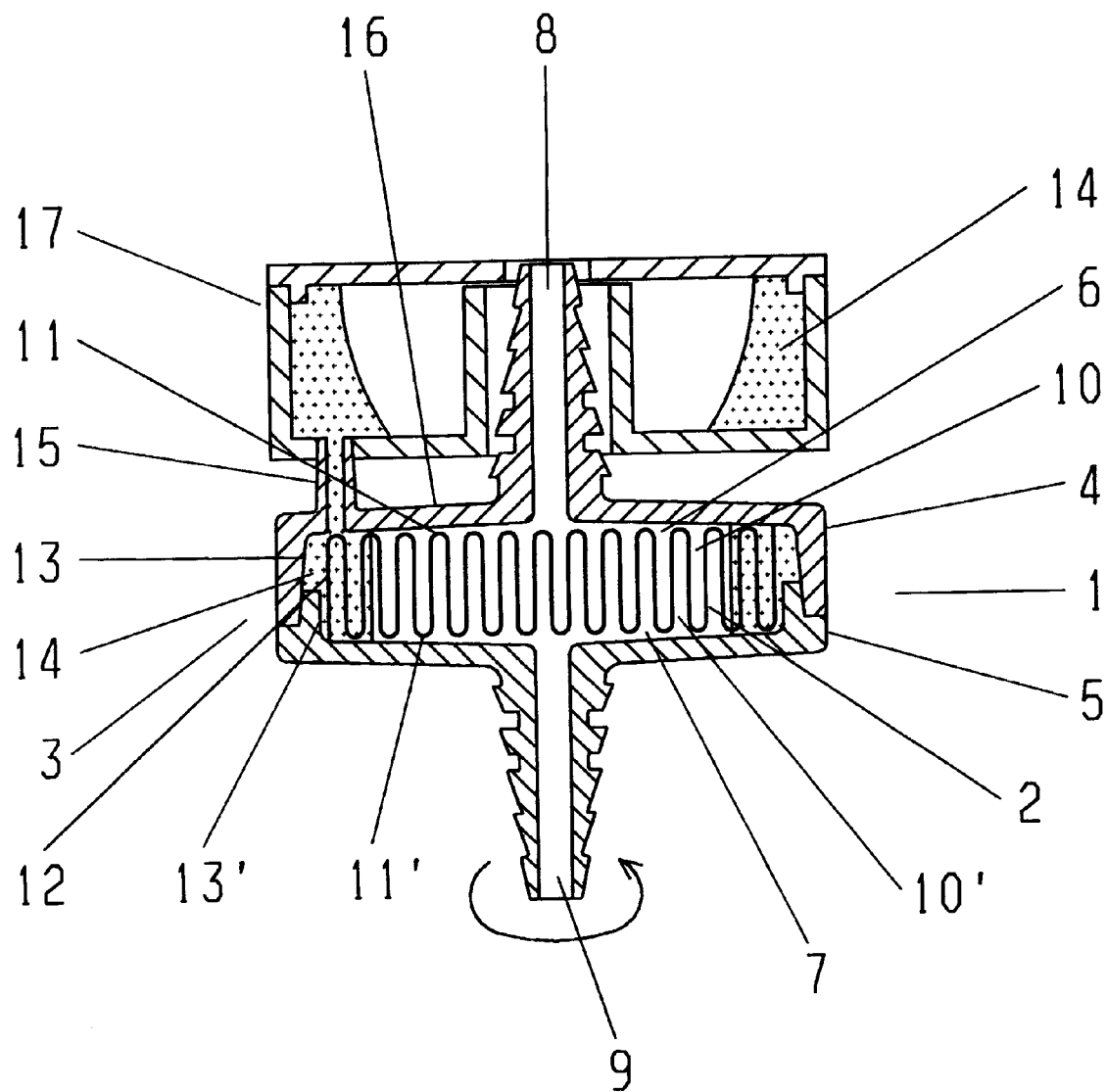
FIG. 1 is a sectional view through an exemplary filtration unit of the present invention coupled with a potting boat.

Manufacture of the filtration unit of the invention is accomplished using generally conventional potting methods. See, for example, U.S. Pat. No. 4,227,295. Curable liquid polymeric materials which form a permanent fluid-tight joint with both the filter element(s) and housing are used as the sealing compound. Preferably such sealants are selected from polyurethanes and epoxies. Suitable housing materials include polymers selected from the group consisting of polystyrenes, polycarbonates, polysulfones, polyethersulfones, and polyacrylates.

Suitable filter materials for the pleated filter element are membrane filters and deep-bed filters in the field of microfiltration and ultrafiltration, alone or in combination with one another. The pleated filter elements may comprise single or multi-ply filter materials. In a preferred embodiment, membrane adsorbers having a specific affinity for the material(s) to be separated are used as the filter element. For high flow outputs, the pleated filter elements are preferably equipped, between the pleat folds, with spacers on the inflow or outflow side, such as textiles or nonwoven fabrics, the inflow side spacers advantageously having a wider mesh or coarser pores than the outflow side spacers. Both round and polygonal pleated elements may be used as filter elements, the former being preferred.

In a particularly advantageous embodiment of the invention, several pleated filter elements are arranged in series for staged filtration. This enhances filtration reliability, adsorption capacity in the case of membrane adsorbers, or, when prefilters are used, the service life of the filtration unit.

Filter supports may be dispensed with altogether if more than one pleated filter element is used and they are placed crosswise to each other, i.e., are arranged so that the fold ridges of one filter element are radially offset with respect to the fold ridges of the adjacent filter element at an angle greater than zero degrees, thereby permitting the ridges of one element to support the adjacent element.

A prefilter may be fabricated in the form of a round unpleated filter element of the same diameter, made for example of a fibrous nonwoven material. Such a prefilter is preferably uniformly joined at its periphery, together with the periphery of the pleated filter element, to the cylindrical housing wall by the integral sealant joint.

In accordance with flow engineering principles, the filtration unit may be equipped with known inflow and outflow devices for fluid feed to be filtered and for filtrate to be collected. Such inflow and outflow devices may be arranged in the filtration device in the form of distributor plates or support plates equipped with channels, or fiber-like plies such as textile plies. An impact/diffusion protector may also be provided on the inlet side of the filter element for protection of the element against mechanical stresses arising from fluid pressures.

Filtration units according to the present invention may be used, by the use of appropriate fluid connectors, in both dead-end and cross-flow modes.

As shown in FIG. 1, filtration unit 1 comprises a pleated filter element 2 arranged in a cylindrical housing 3 comprising mating housing halves 4 and 5. Mating housing halves 4 and 5 are configured so that they can be fitted together in the region of their cylinder walls. Pleated filter element 2 separates housing 3 into inlet side and outlet side plenums 6 and 7, which have respective associated coaxial fluid connectors 8 and 9. Open folds 10 and ridges 11 of a first side of pleated filter element 2 face the inlet side plenum 6, and open folds 10' and ridges 11' of a second side of pleated filter element 2 face the outlet side plenum 7. Peripheral edges 12 of pleated filter element 2 are adjacent cylindrical housing walls 13 and 13', and are joined to them in fluid-tight fashion by means of sealing compound 14.

To manufacture the filtration unit of the invention, at least one filter blank, consisting of pleated filter element 2, is placed into the rotationally symmetrical cylindrical housing 3. Upper housing half 4 is provided in its peripheral region with at least one conical connector 15, and preferably with two conical connectors on opposite peripheral regions of upper housing half 4. Conical connector(s) 15 penetrate through the portion of upper housing half 4 functioning as housing cover 16, and are generally in fluid communication with the region in which peripheral edges 12 of pleated filter element 2 are adjacent cylindrical housing walls 13 and 13'.

In a preferred embodiment, in order to receive sealant material, a small void is created between the outer periphery of the filter blank and the inner wall of the housing by leaving a clearance of less than 1 mm between the periphery of the filter blank and the housing's inner wall. A potting boat 17, containing curable liquid polymer material formable into sealing compound 14 is snugly fitted onto conical connectors 15. The entire two-part assembly is then caused to rotate, as a result of which sealing compound 14 flows by gravity and by centrifugal force from potting boat 17 into housing 3 and is pressed by centrifugal force against cylinder walls 13 and 13', where it bonds housing halves 4 and 5, and simultaneously bonds the cylindrical housing walls 13 and 13' to peripheral edges 12 of pleated filter element 2. Once sealing compound 14 has cured, a single integral fluid-tight joint exists between the components of the filtration unit. After curing, conical connectors 15, which are now filled with cured sealing compound 14, are severed between upper housing half 4 and boat 17.

Figure 2:
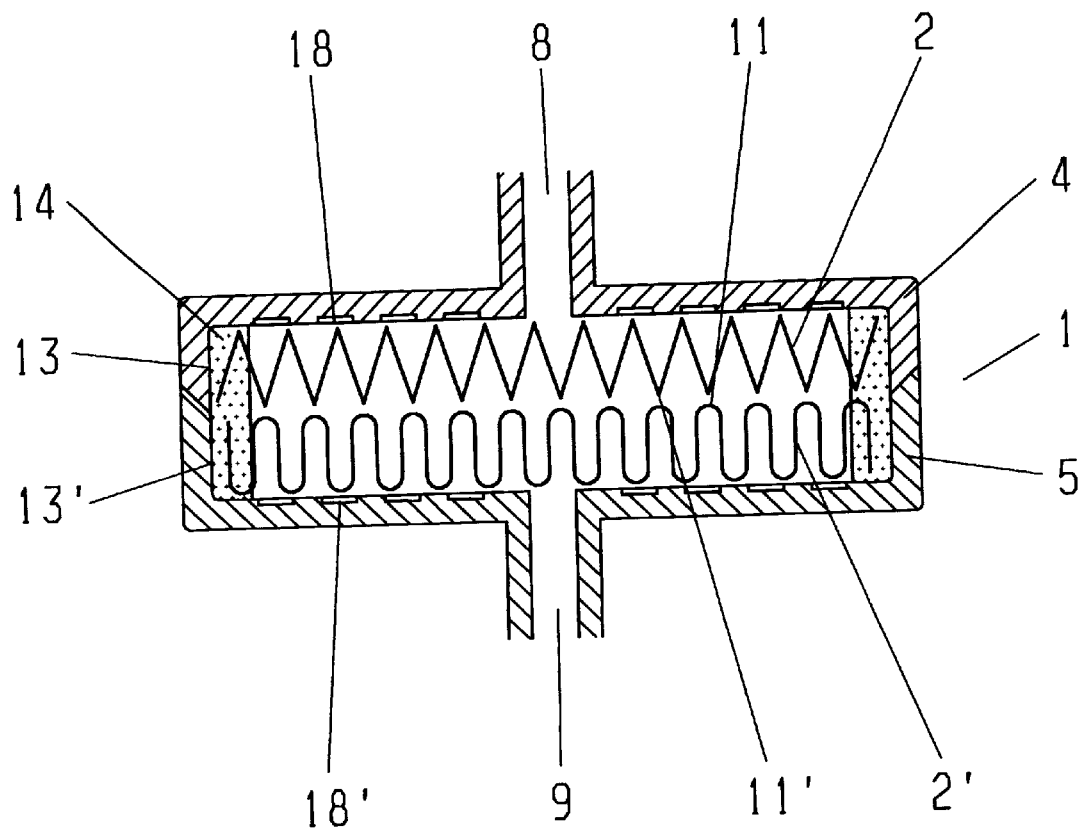
FIG. 2 is a sectional view through an exemplary filtration unit of the present invention having two pleated filter elements.

FIG. 2 depicts a filtration unit 1 according to the present invention having two pleated filter elements 2 and 2' arranged so that ridges 11' of the pleats of filter element 2 are arranged crosswise to ridges 11 of the adjacent filter element 2', i.e., at an angle greater than zero degrees, preferably 90°, so that the two pleated filter elements support each other. Sealing compound 14 bonds peripheral edges 12 and 12' of pleated filter elements 2 and 2' in fluid-tight fashion to cylindrical housing walls 13 and 13'. The inner sides of housing covers 16 and 16' have inflow and outflow concentric flow channels 18 and 18' which ensure a uniform feed flow of fluid for filtration into pleated filter element 2, and a uniform discharge of filtrate after passing through filter elements 2 and 2'.

Figure 3:
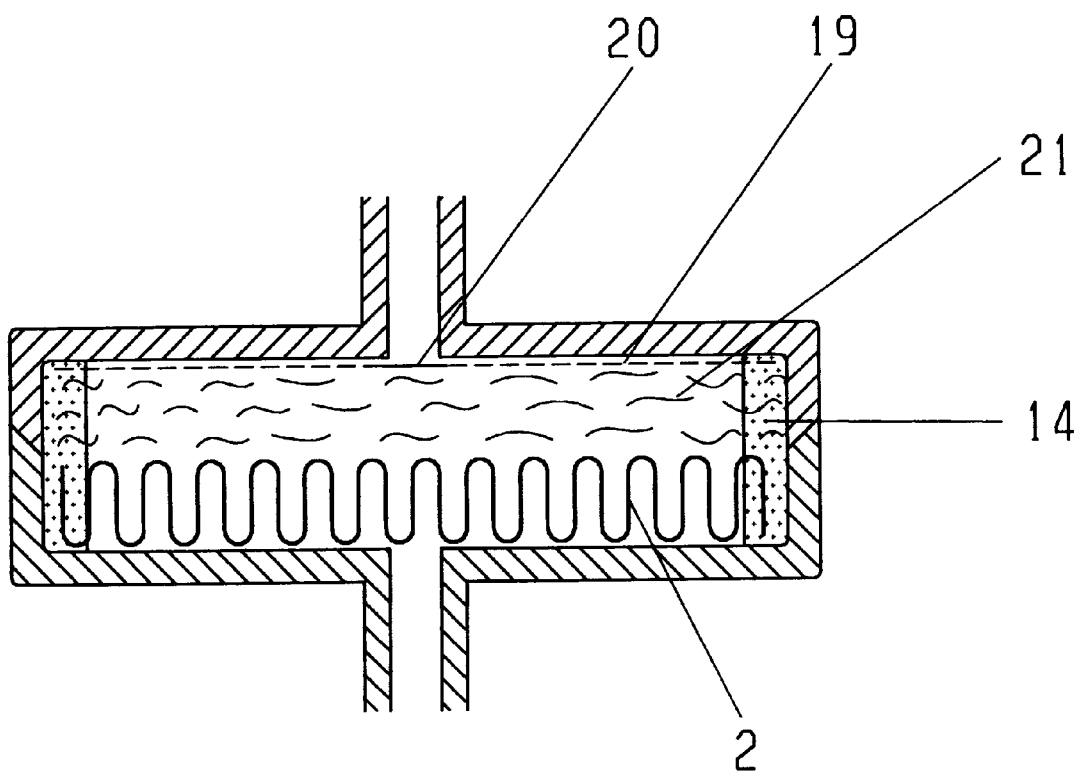
FIG. 3 is a sectional view through an exemplary filtration unit of the present invention having a pleated filter element and a laminar deep-bed filter element as a prefilter.

In FIG. 3 the filtration unit according to the present invention has a textile ply 19 with a flow impingement/diffusor element 20 incorporated therein for better feed flow, and for protection against mechanical overload due to hydraulic pressure from fluid flow. Pleated filter element 2 is preceded by a laminar deep-bed prefilter 21 made, for example, of interlaced synthetic polymeric microfibers.

Figure 4:
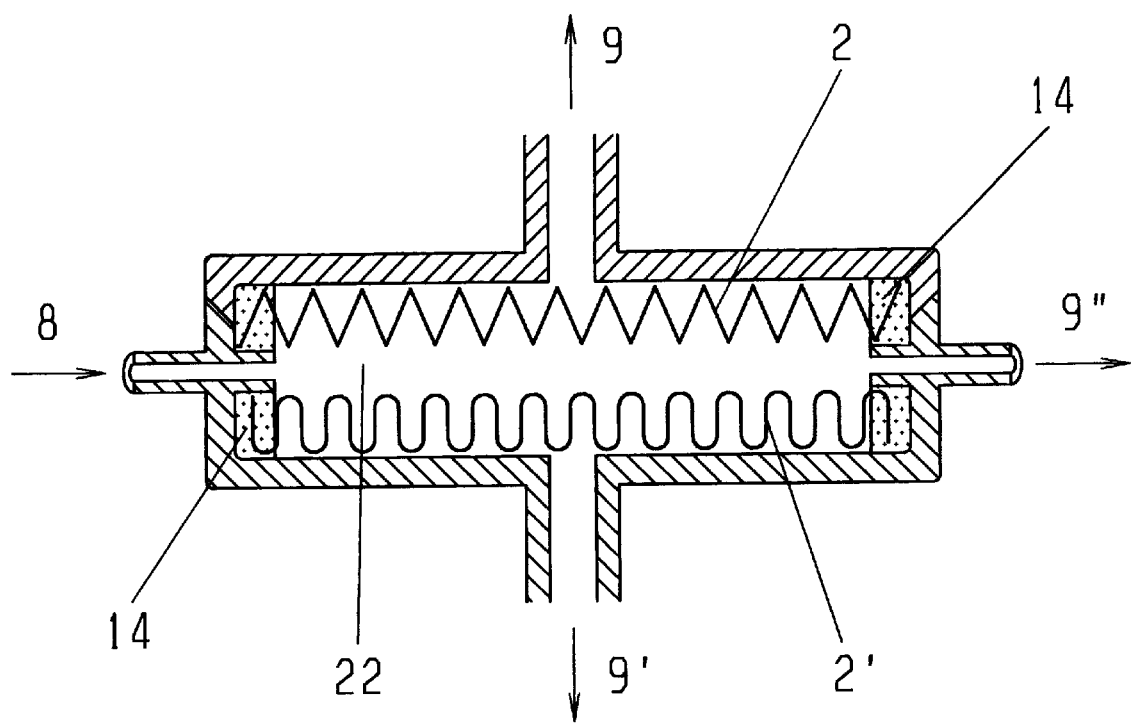
FIG. 4 is a sectional view through an exemplary filtration unit of the present invention being operated in a cross-flow mode.

A cross-flow filtration unit 1 according to the present invention is depicted in FIG. 4, and is provided with filter elements 2 and 2', spaced apart from one another, between which extends a fluid feed plenum 22. The fluid to be filtered is introduced via feed inlet connector 8 into the filtration unit, and the fluid retentate exits the filtration unit through outlet connector 9". Filtrate is removed from the filtration unit via fluid permeate connectors 9 and 9'.

Example

This Example demonstrates one of the many possible applications of the filtration unit according to the present invention. Proteins are separated using membrane adsorber filter elements, taking advantage of both the high adsorption capacity resulting from the surface area of the pleated filter elements, and of the unit's low filtration resistance.

A three-protein mixture comprising 27.5 mg bovine heart lactose dehydrogenase (LDH) (Serva, Heidelberg, Germany), 27.5 mg bovine serum albumin (BSA), and 27.5 mg Cytochrome C (both Sigma, Deisenhofen, Germany) in 0.01 M sodium citrate buffer at pH 3.8 was pumped through a filtration unit 1 having a similar configuration to that shown in FIG. 2, except for being provided with four pleated filter elements, each with an effective diameter of 5 cm and a pleat fold height of 1 cm, and wherein the first pleated filter element comprised three plies of porous membrane adsorber with highly acid ion exchange groups (SARTOBIND S®, Sartorius AG, Goettingen, Germany), the second filter element three plies of the same adsorber material and the third filter element two plies of porous membrane adsorber with Reactive Blue 2 as the active ligand, and the fourth element three plies of porous membrane adsorber with highly basic ion exchange groups (SARTOBIND Q®, Sartorius AG).

All three proteins were adsorbed quantitatively, as indicated by analysis of the filtrate, on the highly acid ion exchange adsorber. 100 ml of a 0.01 M potassium phosphate buffer, pH 7.0, was then pumped through the filtration unit. This resulted in selective desorption of the LDH and the BSA from the acid ion exchange adsorber, and subsequent adsorption on the Reactive Blue 2 adsorber filter element. None of the three proteins were detectable in the filtrate. Then 100 ml of a 0.01 M potassium phosphate buffer with 5 mM nicotinamide adenine dinucleotide (NADH) (Serva) were pumped through the filtration unit. This resulted in selective desorption of the LDH from the Reactive Blue 2 adsorber filter element, and subsequent adsorption on the highly basic ion exchange adsorber filter element. None of the three proteins were detectable in the outflowing filtrate. Then 100 ml of a 0.01 M sodium citrate buffer, pH 3.8, were pumped through the filtration unit. Only the LDH was detected in the filtrate. Then 100 ml of 0.01 M tris (hydroxymethyl)aminomethane hydrochloride buffer, pH 8, was pumped through the filtration unit, and the BSA was selectively desorbed. Lastly, 100 ml of 1 M potassium phosphate buffer, pH 7.0, was pumped through the filtration unit, and the Cytochrome C was quantitatively desorbed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A filtration unit for separating a substance from a fluid comprising at least one pleated filter element arranged in a cylindrical housing, said housing comprising two mating housing components and at least two fluid connectors, said filter element separating said housing into inlet and outlet plenums, the periphery of said filter element being adjacent the wall of said cylindrical housing, with the periphery of said filter element and the periphery of said mating components being bonded to each other by a single, substantially integral bond comprising a polymeric sealant.

2. The filtration unit of claim 1 wherein said polymeric sealant is selected from the group consisting of polyurethanes and epoxy resins.

3. The filtration unit of claim 1 containing at least two pleated filter elements that are radially offset relative to each other at an angle of from >0° to 90°.

4. The filtration unit of claim 1 containing a laminar, unpleated, fibrous filter element adjacent to said at least one pleated filter element.

5. The filtration unit of claim 1 wherein said at least one pleated filter element is selected from single-ply and multi-ply.

6. The filtration unit of claim 1 wherein said at least one pleated filter element has spacers between pleats.

7. The filtration unit of claim 1 wherein said at least one pleated filter element has pore sizes selected from the group consisting of sizes in the ultrafiltration and microfiltration range.

8. The filtration unit of claim 7 wherein said at least one filter element is a membrane adsorber having a specific affinity for the substance to be separated.

* * * * *

UNITED STATES PATENT AND TRADEMARK OFFICE
CERTIFICATE OF CORRECTION

| | |
|---|---|
| PATENT NO. : 6,143,174 | Page 1 of 1 |
| DATED : November 7, 2000 | |
| INVENTOR(S) : Andreas Graus | |

It is certified that error appears in the above-identified patent and that said Letters Patent is hereby corrected as shown below:

Following the filling date recited next to item [22] insert the following:
--     [30] Foreign Application Priority Data
        September 1, 1997 [PCT] .... EP97/04738
        September 5, 1996 [DE] .... 19636006.4     --

Signed and Sealed this

Sixteenth Day of October, 2001

Attest:

*Nicholas P. Godici*

NICHOLAS P. GODICI
*Attesting Officer*      *Acting Director of the United States Patent and Trademark Office*